(12) United States Patent
Iwamoto et al.

(10) Patent No.: US 11,436,802 B2
(45) Date of Patent: Sep. 6, 2022

(54) OBJECT MODELING AND MOVEMENT METHOD AND APPARATUS, AND DEVICE

(71) Applicant: HUAWEI TECHNOLOGIES CO., LTD., Guangdong (CN)

(72) Inventors: Naoya Iwamoto, Tokyo (JP); Tizheng Wang, Shenzhen (CN); Caihua Lei, Tokyo (JP)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/931,024

(22) Filed: Jul. 16, 2020

(65) Prior Publication Data

US 2020/0349765 A1 Nov. 5, 2020

Related U.S. Application Data

(63) Continuation of application No. PCT/CN2019/088480, filed on May 27, 2019.

(30) Foreign Application Priority Data

Jun. 21, 2018 (CN) .......................... 201810646701.0

(51) Int. Cl.
*G06T 15/00* (2011.01)
*G06T 17/20* (2006.01)
(Continued)

(52) U.S. Cl.
CPC ............ *G06T 17/205* (2013.01); *G06T 7/507* (2017.01); *G06T 7/579* (2017.01); *G06T 13/40* (2013.01);
(Continued)

(58) Field of Classification Search
CPC ....... G06T 17/205; G06T 7/507; G06T 7/579; G06T 13/40; G06T 17/10; G06T 19/20;
(Continued)

(56) References Cited

U.S. PATENT DOCUMENTS

| 8,542,252 B2 | 9/2013 | Perez et al. |
| 9,959,671 B1 * | 5/2018 | Carriere, IV ........... G06T 17/20 |

(Continued)

FOREIGN PATENT DOCUMENTS

| CN | 102448565 A | 5/2012 |
| CN | 102800126 A | 11/2012 |

(Continued)

OTHER PUBLICATIONS

Anonymous: "Kinect", Wikipedia, May 28, 2021, Retrieved from https://en.wikipedia.org/wiki/Kinect. 31 pages.
(Continued)

*Primary Examiner* — Weiming He
(74) *Attorney, Agent, or Firm* — Womble Bond Dickinson (US) LLP

(57) ABSTRACT

The present invention discloses an object modeling and movement method. The method is applied to a mobile terminal, and the mobile terminal includes a color camera and a depth camera. The method includes: performing panoramic scanning on a target object by using the color camera and the depth camera, to obtain a 3D model of the target object; obtaining a target skeletal model; fusing the target skeletal model and the 3D model of the target object; obtaining a target movement manner; and controlling the target skeletal model in the target movement manner, to animate the 3D model of the target object in the target movement manner. This can implement integration from scanning, 3D reconstruction, skeletal rigging, to preset animation display for an object on one terminal, thereby implementing dynamization of a static object, and increasing interest in using the mobile terminal by a user.

23 Claims, 10 Drawing Sheets

(51) Int. Cl.
  *G06T 7/507* (2017.01)
  *G06T 13/40* (2011.01)
  *G06T 17/10* (2006.01)
  *G06T 7/579* (2017.01)
  *G06T 19/20* (2011.01)

(52) U.S. Cl.
  CPC ............. *G06T 17/10* (2013.01); *G06T 19/20* (2013.01); *G06T 2200/24* (2013.01); *G06T 2207/10028* (2013.01); *G06T 2219/2016* (2013.01); *G06T 2219/2021* (2013.01); *G06T 2219/2024* (2013.01)

(58) Field of Classification Search
  CPC ....... G06T 2200/24; G06T 2207/10028; G06T 2219/2016; G06T 2219/2024
  See application file for complete search history.

(56) References Cited

U.S. PATENT DOCUMENTS

| | | | |
|---|---|---|---|
| 2012/0306924 | A1 | 12/2012 | Willoughby et al. |
| 2014/0300688 | A1* | 10/2014 | Shin ................ G03B 37/02 348/36 |
| 2015/0255005 | A1* | 9/2015 | Yoda ................ G06T 17/00 434/265 |
| 2017/0054897 | A1* | 2/2017 | Shanmugam .... H04N 5/232935 |
| 2018/0047157 | A1* | 2/2018 | Sinha .................. G06T 7/0012 |
| 2018/0225858 | A1* | 8/2018 | Ni ....................... G06T 17/20 |

FOREIGN PATENT DOCUMENTS

| | | | |
|---|---|---|---|
| CN | 203240221 | * | 1/2013 |
| CN | 102915112 | A | 2/2013 |
| CN | 103597516 | A | 2/2014 |
| CN | 103703489 | A | 4/2014 |
| CN | 104021584 | A | 9/2014 |
| CN | 105137973 | A | 12/2015 |
| CN | 105225269 | A | 1/2016 |
| CN | 105590096 | A | 5/2016 |
| CN | 106251389 | A | 12/2016 |
| CN | 107248195 | A | 10/2017 |
| CN | 107274465 | A | 10/2017 |
| CN | 107577334 | A | 1/2018 |
| CN | 108053435 | A | 5/2018 |
| CN | 108154551 | A | 6/2018 |
| JP | 2004334662 | A | 11/2004 |
| JP | 2013101527 | A | 5/2013 |
| JP | 2014517413 | A | 7/2014 |
| JP | 2015531098 | A | 10/2015 |
| JP | 2017080203 | A | 5/2017 |
| JP | 2017182695 | A | 10/2017 |
| JP | 2017539169 | A | 12/2017 |
| KR | 20140043378 | A | 4/2014 |
| KR | 20160041965 | A | 4/2016 |
| KR | 20170119496 | A | 10/2017 |

OTHER PUBLICATIONS

Shihong Xia et al., A Survey on Human Performance Capture and Animation. Journal of Computer Science and Technology, Science Press, Beijing, CN, vol. 32, No. 3, May 12, 2017, 19 pages.

Rina Kato, and two others, Fundamental Study on Automatic Recognition of Non-Manual Signals in JSL using HMM , IEICE Technical Report, The Institute of Electronics, Information and Communication Engineers, 2016, vol. 116, No. 139, p. 15-19.

* cited by examiner

Texture map set     Mesh model     Texture-mapped mesh model

OBJECT MODELING AND MOVEMENT METHOD AND APPARATUS, AND DEVICE

CROSS-REFERENCE TO RELATED APPLICATIONS

This application is a continuation of International Application No. PCT/CN2019/088480, filed on May 27, 2019, which claims priority to Chinese Patent Application No. 201810646701.0, filed on Jun. 21, 2018. The disclosures of the aforementioned applications are hereby incorporated by reference in their entireties.

TECHNICAL FIELD embodiments of the present invention relate to the field of terminal technologies, and in particular, to an object modeling and movement method and apparatus, and a device.

BACKGROUND

With development of information and communications technologies, people get more in contact with graphics and images in their life and work. A method for obtaining an image is performed by using various video cameras, cameras, scanners, or the like. Usually, only a planar image of an object, that is, two-dimensional information of the object can be obtained by using these means. In many fields such as machine vision, facial detection, physical profiling, automated processing, product quality control, and biomedicine, three-dimensional (3D) information of an object is essential. Therefore, a 3D scanning technology emerges. A commonly-used device is a three-dimensional scanner (3D scanner). The 3D scanner is a scientific instrument used to detect and analyze a real-world object or environment, to collect data on a shape (a geometric structure) and an appearance (properties such as a color and a surface albedo). The three-dimensional scanner is used to create a point cloud on a geometric surface of an object. These points may be used to form a surface shape of the object through interpolation. Denser point clouds may create a more accurate model (such a process is also referred to as 3D reconstruction). If the scanner can obtain a color of the surface, a texture map may further be wrapped around the reconstructed surface, and this is referred to as texture mapping.

However, in the prior art, as it is difficult to use the three-dimensional scanner, only a professional user can operate the three-dimensional scanner. In addition, application scenarios of the three-dimensional scanner are also relatively limited. Therefore, how to enable a common user to use the three-dimensional scanning technology is an urgent problem to be resolved.

SUMMARY

Embodiments of the present invention provide an object modeling and movement method and apparatus, and a device, so that a user can scan an object anytime and anywhere, to achieve a dynamic effect, increase interest and playability, improve user stickiness, and enable the user to stay ahead of the trend.

Specific technical solutions provided in the embodiments of the present invention are as follows.

According to a first aspect, an embodiment of the present invention provides an object modeling and movement method. The method is applied to a mobile terminal, and the mobile terminal includes a color camera and a depth camera. The color camera and the depth camera are located on one side: a front side or a rear side of the mobile terminal. The method specifically includes: performing panoramic scanning on a target object by using the color camera and the depth camera, to obtain a 3D model of the target object; obtaining a target skeletal model; fusing the target skeletal model and the 3D model of the target object; obtaining a target movement manner; and controlling the target skeletal model in the target movement manner, to animate the 3D model of the target object in the target movement manner.

According to a second aspect, an embodiment of the present invention provides an object modeling and movement apparatus. The apparatus is applied to a mobile terminal, and the mobile terminal includes a color camera and a depth camera. The color camera and the depth camera are located on one side: a front side or a rear side of the mobile terminal. The apparatus includes: a scanning module, configured to perform panoramic scanning on a target object by using the color camera and the depth camera, to obtain a 3D model of the target object; a first obtaining module, configured to obtain a target skeletal model; a fusion module, configured to fuse the target skeletal model and the 3D model of the target object; a second obtaining module, configured to obtain a target movement manner; and a movement module, configured to control the target skeletal model in the target movement manner, to animate the 3D model of the target object in the target movement manner.

According to the technical solutions of the foregoing method and apparatus provided in the embodiments of the present invention, an integrated design from scanning, 3D reconstruction, skeletal rigging, to preset animation display can be implemented for an object on the mobile terminal, without requiring a user to use a professional, heavy, and complex device for professional scanning or performing complex modeling and animation processing on a PC end. These functions are integrated and provided for the user, so that the user can easily perform these operation methods on the mobile terminal, and any "static object (or similar to a static object)" around the user can be animated and vitalized, thereby increasing interest in using the terminal by the user and improving user experience.

It should be understood that in the media field, "camera" and "lens" may be synonymous.

In one embodiment, the depth camera may use a TOF module.

In one embodiment, the depth camera may use a structured light sensor module.

In one embodiment, a field of view of the depth camera ranges from 40 degrees to 80 degrees.

In one embodiment, a transmit power of infrared light in the depth camera may be selected to range from 50 mw to 400 mw. For ultra-strong light in special application, a transmit power may be higher.

In one embodiment, a scanning distance for object scanning ranges from 20 cm to 80 cm. The scanning distance may be understood as a distance from the depth camera to the target object.

In one embodiment, a shooting frame rate of the depth camera in a scanning process may be selected to be not less than 25 fps.

In one embodiment, a skeletal model may be computed by using a series of algorithms based on the 3D model.

In one embodiment, a skeletal model production library, for example, some line segments and points, may be provided for the user, where the line segment represents a skeleton, and the point represents a joint node. An operation instruction of the user, for example, a gesture, a slide, or a shortcut key, is received; and at least two line segments and at least one point are combined into a skeletal model, to obtain the skeletal model. Further, the skeletal model is uploaded to a cloud or is locally stored. The method may be implemented by the first obtaining module. In hardware, the method may be implemented by a processor by invoking a program instruction in a memory.

In one embodiment, a more open production library may be provided for the user, and a line segment and a point are completely freely designed by the user, where the line segment represents a skeleton, and the point represents a joint node. An operation instruction of the user, for example, a gesture, a slide, or a shortcut key, is received; and at least two line segments and at least one point are combined into a skeletal model, to obtain the skeletal model. Further, the skeletal model is uploaded to a cloud or is locally stored. The method may be implemented by the first obtaining module. In hardware, the method may be implemented by the processor by invoking a program instruction in the memory.

In one embodiment, a skeletal model with a highest degree of matching with a shape of the target object may be selected as the target skeletal model from at least one preset skeletal model. The preset skeletal model may be stored in a network or a cloud, or may be locally stored. For example, a chicken skeletal model, a dog skeletal model, and a fish skeletal model are locally stored. When the target object is a duck, a system uses the chicken skeletal model as the target skeletal model through appearance recognition. A criterion for determining similarity includes but is not limited to a skeleton form, a skeleton length, a skeleton thickness, a skeleton quantity, a skeleton composition manner, and the like. The method may be implemented by the first obtaining module. In hardware, the method may be implemented by the processor by invoking a program instruction in the memory.

In one embodiment, a selection instruction of the user may be received, where the selection instruction is used to select the target skeletal model from the at least one preset skeletal model, where these preset models are locally stored or invoked from the cloud or the network. The method may be implemented by the first obtaining module. In hardware, the method may be implemented by the processor by invoking a program instruction in the memory.

In one embodiment, a movement manner of a first object may be obtained, and the movement manner of the first object is used as the target movement manner. The first object may be an object that currently moves in real time, or a movement manner that is of an object and that was captured and stored, or may be a preset movement manner of a specific object. The method may be implemented by the second obtaining module. In hardware, the method may be implemented by the processor by invoking a program instruction in the memory.

In one embodiment, one of preset target movement manners may be selected. The method may be implemented by the second obtaining module. In hardware, the method may be implemented by the processor by invoking a program instruction in the memory. The preset target movement manner may be a set of complete movement manners, or may be a movement manner corresponding to a user operation. For example, if the user waves the user's hand to a "revitalized object" displayed on the terminal, the object may move according to a preset waving responding animation manner. More generally, the user may input a preset interaction action to the terminal, and the terminal obtains a corresponding responding movement manner based on the interaction action, and animates the 3D model of the object to be animated according to the responding movement manner.

In one embodiment, the movement manner may be made by the user by using animation production software. Certainly, the software may be a toolkit embedded in a system, or a toolkit loaded in an app for scanning and movement rebuilding, or may be from a third-party animation design tool. The movement manner may be a movement manner or animation that was historically made or is currently made. The method may be implemented by the second obtaining module. In hardware, the method may be implemented by the processor by invoking a program instruction in the memory.

In one embodiment, the movement manner may be that a movement manner with a highest attribute matching degree is selected as the target movement manner from a plurality of prestored movement manners based on a physical attribute. The method may be implemented by the second obtaining module. In hardware, the method may be implemented by the processor by invoking a program instruction in the memory.

In one embodiment, the movement manner may alternatively be that the system or the user self-designs a skeletal model based on the skeletal model (which may be obtained by using any method in the foregoing design) of the target object, to obtain the target movement manner. Such a manner is a most appropriate animation operation for subsequently implementing animation on the 3D model of the object. The method may be implemented by the second obtaining module. In hardware, the method may be implemented by the processor by invoking a program instruction in the memory.

In one embodiment, after scanning the 3D model of the object, the user may locally store the 3D model or store the 3D model in a cloud, directly invoke the 3D model after a period of time, freely select skeleton rigging or an animation manner, and further select an animation background, including but not limited to a real-time captured image, a locally-stored image, a data image in the cloud, and the like. In addition, a shadow of the object may further be displayed or a sound effect, a special effect, or the like may be added while animation of the object is implemented. The animation may be automatically played by the mobile terminal, or may be controlled to be played by inputting an operation instruction by the user.

In one embodiment, in the process of controlling the skeletal model to be animated in the target movement manner, a skinning operation is performed on the skeletal model and the 3D model of the target object, where the skinning operation is used to determine a position change of a point on a surface of the 3D model based on movement of the skeletal model; and the 3D model of the target object is animated along with the skeletal model. The method may be implemented by the movement module. In hardware, the method may be implemented by the processor by invoking a program instruction in the memory.

By using the foregoing possible embodiments, human-computer interaction is enhanced, so that the user can more freely and deeply participate in the revitalization process of the object, with creative imagination and more interest.

More specifically, other technology implementations related to the foregoing operations may be correspondingly processed by the processor by invoking a program and an instruction in the memory, for example, enabling a camera, collecting an image, generating a 3D model, obtaining a skeletal model or animation, storing the skeletal model or the animation, adding a special effect, and performing an interaction operation with a user.

According to a third aspect, an embodiment of the present invention provides a terminal device. The terminal device includes a memory, a processor, a bus, a depth camera, and a color camera. The color camera and the depth camera are located on one side of the mobile terminal. The memory, the depth camera, the color camera, and the processor are connected by using a bus. The depth camera and the color camera are configured to perform panoramic scanning on a target object under control of the processor. The memory is configured to store a computer program and an instruction. The processor is configured to invoke the computer program and the instruction stored in the memory, to enable the terminal device to perform any one of the foregoing possible design methods.

In one embodiment, the terminal device further includes an antenna system. The antenna system sends and receives a wireless communication signal under control of the processor, to implement wireless communication with a mobile communications network. The mobile communications network includes one or more of the following: a GSM network, a CDMA network, a 3G network, a 4G network, a 5G network, FDMA, TDMA, PDC, TACS, AMPS, WCDMA, TDSCDMA, Wi-Fi, and an LTE network.

It should be understood that content in the Summary may include all methods that can be implemented in the Claims, and enumeration is not made herein.

For any one of the foregoing possible implementation methods and steps, free combinations of different methods and steps may be performed without violating a natural law, and some possible steps may be added or reduced for different methods and steps. This is not listed one by one or described in detail in the present invention.

In the present invention, integration from scanning, 3D reconstruction, skeletal rigging, to preset animation display for an object can be implemented on one terminal, thereby implementing revitalization of a static object, and increasing interest in using the mobile terminal by the user.

DESCRIPTION OF EMBODIMENTS

The following clearly describes the technical solutions in the embodiments of the present invention with reference to the accompanying drawings in the embodiments of the present invention. It is clearly that, the described embodiments are merely some but not all of the embodiments of the present invention. All other embodiments obtained by persons of ordinary skill in the art based on the embodiments of the present invention without creative efforts shall fall within the protection scope of the present invention.

In the embodiments of the present invention, a mobile terminal may be a device that provides a user with a shooting function and/or data connectivity, a handheld device with a wireless connection function, or another processing device connected to a wireless modem, for example, a digital camera, a single-lens reflex camera, or a smartphone, or may be another intelligent device with a shooting function and a display function, for example, a wearable device, a tablet computer, a PDA (personal digital assistant), a drone, or an aerial photographer.

Figure 1:
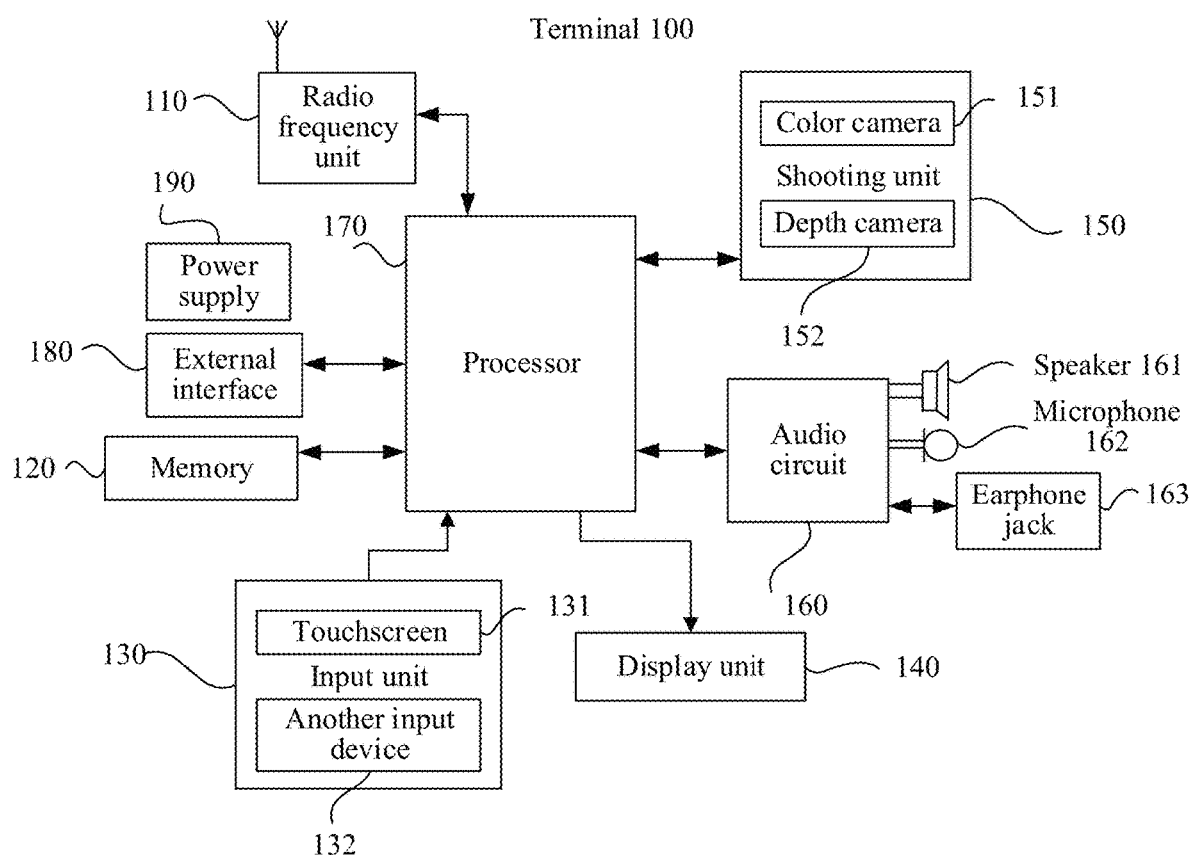
FIG. 1 is a schematic structural diagram of a terminal according to an embodiment of the present invention.

FIG. 1 is a schematic diagram of an optional hardware structure of a terminal 100.

Referring to FIG. 1, the terminal 100 may include components such as a radio frequency unit 110, a memory 120, an input unit 130, a display unit 140, a shooting unit 150, an audio circuit 160, a speaker 161, a microphone 162, a processor 170, an external interface 180, and a power supply 190.

The radio frequency unit 110 may be configured to send and receive information or send and receive a signal in a call process. Particularly, after receiving downlink information of a base station, the radio frequency unit 110 delivers the downlink information to the processor 170 for processing, and sends related uplink data to the base station. Generally, an RF (radio frequency) circuit includes but is not limited to an antenna, at least one amplifier, a transceiver, a coupler, a low noise amplifier (LNA), a duplexer, and the like. In addition, the radio frequency unit 110 may further communicate with a network device and another device through wireless communication. Any communications standard or protocol may be used for the wireless communication, including but not limited to a global system for mobile communications (GSM), a general packet radio service (GPRS), code division multiple access (CDMA), wideband code division multiple access (WCDMA), long term evolution (LTE), an email, a short messaging service (SMS), and the like.

The memory 120 may be configured to store an instruction and data. The memory 120 may mainly include an instruction storage area and a data storage area. The data storage area may store an association relationship between a joint touch gesture and an application program function. The instruction storage area may store software units such as an operating system, an application, and an instruction required by at least one function, or a subset or an extension set of the software units. The memory 120 may further include a non-volatile random access memory and provide the processor 170 with functions including managing hardware, software, and data resources in a computing processing device and supporting control on the software and the application. The memory 120 is further configured to store a multimedia file, an execution program, and an application.

The input unit 130 may be configured to receive input digit or character information, and generate a key signal input related to user settings and function control of a portable multifunctional apparatus. Specifically, the input unit 130 may include a touchscreen 131 and another input devices 132. The touchscreen 131 may collect a touch operation (for example, an operation performed by a user on the touchscreen or near the touchscreen by using any appropriate object such as a finger, a joint, or a stylus) of the user on or near the touchscreen, and drive a corresponding connection apparatus according to a preset program. The touchscreen may detect a touch action of the user on the touchscreen, convert the touch action into a touch signal, send the touch signal to the processor 170, and receive and execute a command sent by the processor 170. The touch signal includes at least touch point coordinate information. The touchscreen 131 may provide an input screen and an output screen between the terminal 100 and the user. In addition, the touchscreen may be implemented in various types such as a resistive type, a capacitive type, an infrared type, and a surface acoustic wave type. In addition to the touchscreen 131, the input unit 130 may further include the another input device. Specifically, the another input device 132 may include but is not limited to one or more of a physical keyboard, a function key (such as a volume control key or a power on/off key), a trackball, a mouse, a joystick, and the like.

Further, the touchscreen 131 may cover a display panel 141. After detecting the touch operation on or near the touchscreen 131, the touchscreen 131 transfers the touch operation to the processor 170 to determine a type of a touch event. Then the processor 170 provides a corresponding visual output on the display panel 141 based on the type of the touch event. In the embodiments, the touchscreen and the display unit may be integrated into one component to implement input, output, and display functions of the terminal 100. For ease of description, in the embodiments of the present invention, a touch display screen represents a set of functions of the touchscreen and the display unit. In some embodiments, the touchscreen and the display unit may alternatively be used as two independent components.

The display unit 140 may be configured to display information input by the user, information provided for the user, and various menus of the terminal 100. In the embodiments of the present invention, the display unit is further configured to display an image obtained by a display device by using the camera 150, where the image may include a preview image in some shooting modes, an initial image that is captured, and a target image that is processed by using a specific algorithm after shooting.

The shooting unit 150 is configured to collect an image or a video and may be enabled through triggering by an application program instruction, to implement a shooting function or a video camera function. The shooting unit may include components such as an imaging lens, a light filter, and an image sensor. Light emitted or reflected by an object enters the imaging lens and is aggregated on the image sensor by passing through the light filter. The imaging lens is mainly configured to aggregate light emitted or reflected by an object (which may also be referred to as a to-be-captured object or a target object) in a shooting field of view and perform imaging. The light filter is mainly configured to filter out an extra light wave (for example, a light wave other than visible light, such as infrared light) from light. The image sensor is mainly configured to perform optical-to-electrical conversion on a received optical signal, convert the optical signal into an electrical signal, and input the electrical signal to the processor 170 for subsequent processing.

In one embodiment, the shooting unit 150 may further include a color camera (a color lens) 151 and a depth camera (a depth lens) 152. The color camera is configured to collect a color image of the target object, and includes a color camera commonly used among currently popular terminal products. The depth camera is configured to obtain depth information of the target object. For example, the depth camera may be implemented by using a TOF technology and a structured light technology.

TOF is an abbreviation of a time of flight technology. To be specific, a sensor emits modulated near-infrared light, where the light is reflected after encountering an object; the sensor computes a time difference or a phase difference between light emission and light reflection, to convert into a distance of a captured scene, so as to generate depth information; and further, in combination with a shooting function of a conventional color camera, a three-dimensional outline of an object can be presented by using a topographic map in which different colors represent different distances.

Structured light is a set of system structures including a projection element and a camera. After the projection element projects specific light information (for example, light information diffracted by a raster) to a surface and a background of an object, the camera collects the light information; and information such as a position and a depth of the object is computed based on a change (for example, a change in a light width and a displacement) of an optical signal caused by the object, to further restore an entire three-dimensional space.

The audio circuit 160, the speaker 161, and the microphone 162 may provide an audio interface between the user and the terminal 100. The audio circuit 160 may transmit, to the speaker 161, an electrical signal converted from received audio data, and the speaker 161 converts the electrical signal into a sound signal for output. In addition, the microphone 162 is configured to collect a sound signal, and may further convert the collected sound signal into an electrical signal. After receiving the electrical signal, the audio circuit 160 converts the electrical signal into audio data, outputs the audio data to the processor 170 for processing, and sends the audio data to, for example, another terminal through the radio frequency unit 110, or outputs the audio data to the memory 120 for further processing. The audio circuit may also include an earphone jack 163, configured to provide a connection interface between the audio circuit and an earphone.

The processor 170 is a control center of the terminal 100, and is connected to various parts of an entire mobile phone through various interfaces and lines. The processor 170 performs various functions of the terminal 100 and processes data by running or executing the instruction stored in the memory 120 and invoking the data stored in the memory 120, so as to perform overall monitoring on the mobile phone. Optionally, the processor 170 may include one or more processing units. Preferably, the processor 170 may be integrated with an application processor and a modem processor. The application processor mainly processes an operating system, a user interface, an application program, and the like. The modem processor mainly processes wireless communication. It may be understood that the modem processor may alternatively not be integrated into the processor 170. In some embodiments, the processor and the memory may be implemented on a single chip. In some embodiments, the processor and the memory may be separately implemented on independent chips. The processor 170 may further be configured to: generate a corresponding operation control signal, send the operation control signal to a corresponding component in a computation processing device, and read and process data in software, especially read and process the data and a program in the memory 120, so that functional modules perform corresponding functions, to control corresponding components to perform operations as required by instructions.

The terminal 100 further includes the external interface 180. The external interface may be a standard micro-USB interface or a multi-pin connector. The external interface may be configured to connect the terminal 100 to another apparatus for communication, or may be configured to connect to a charger to charge the terminal 100.

The terminal 100 further includes the power supply 190 (such as a battery) that supplies power to each component. Preferably, the power supply may be logically connected to the processor 170 by using a power supply management system, so as to implement functions such as a charging function, a discharging function, and power consumption management by using the power supply management system.

Although not shown, the terminal 100 may further include a flash, a wireless fidelity (wireless fidelity, Wi-Fi) module, a Bluetooth module, sensors with different functions, and the like. Details are not described herein. All of the methods described below can be applied to the terminal shown in FIG. 1. In addition, persons skilled in the art may understand that FIG. 1 is merely an example of the portable multi-function apparatus, and does not constitute any limitation on the portable multi-function apparatus. The portable multi-function apparatus may include more or fewer components than those shown in the figure, or combine some components, or have different components.

Figure 2:
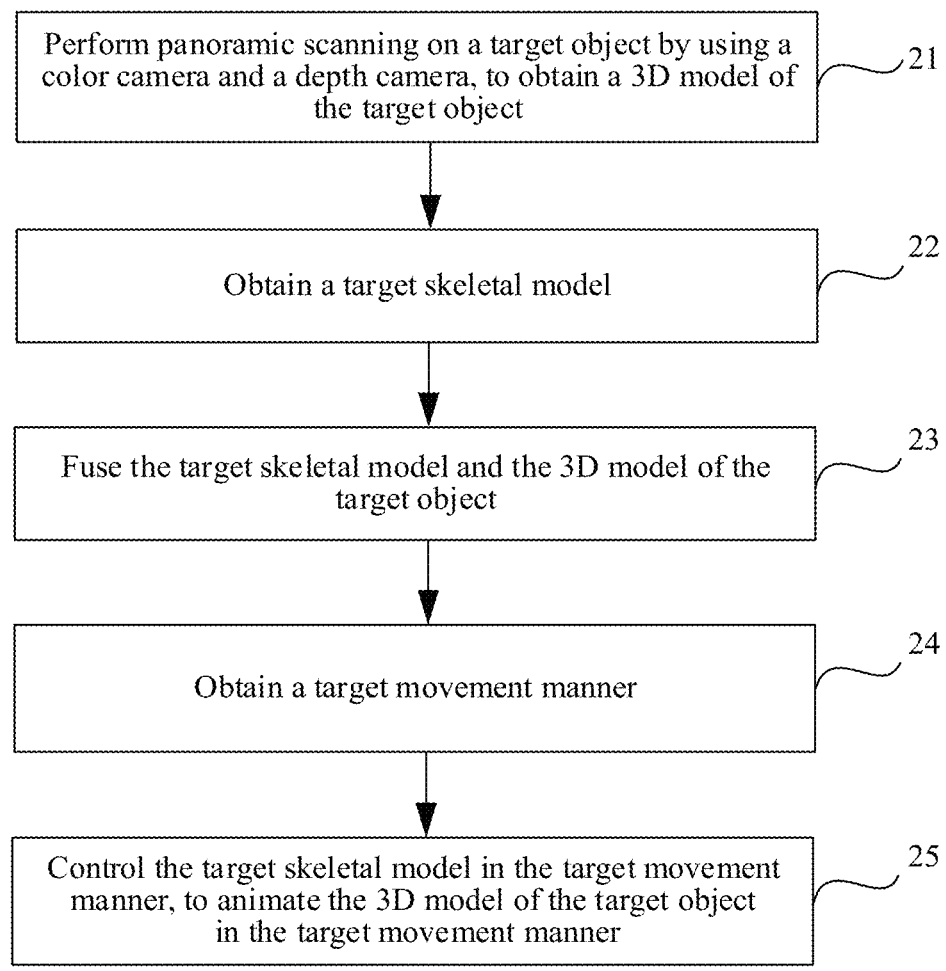
FIG. 2 is a flowchart of an object modeling and movement method according to an embodiment of the present invention.

Referring to FIG. 2, an embodiment of the present invention provides an object modeling and movement method. The method is applied to a mobile terminal, and the mobile terminal includes a color camera and a depth camera. The color camera and the depth camera are located on one side of the mobile terminal. The method includes the following operations:

Operation 21: Perform panoramic scanning on a target object (that is, a to-be-scanned object, which is referred to as object for short in some paragraphs) by using the color camera and the depth camera, to obtain a 3D model of the target object.

Operation 22: Obtain a target skeletal model.

Operation 23: Fuse the target skeletal model and the 3D model of the target object.

Operation 24: Obtain a target movement manner.

Operation 25: Control the target skeletal model in the target movement manner, to animate the 3D model of the target object in the target movement manner.

The color camera and the depth camera may be located at a front side of the terminal device, or may be located at a rear side of the terminal device. A specific arrangement manner and quantities of color cameras and depth cameras may be flexibly determined based on a requirement of a designer. This is not limited in the present invention.

Figure 3:
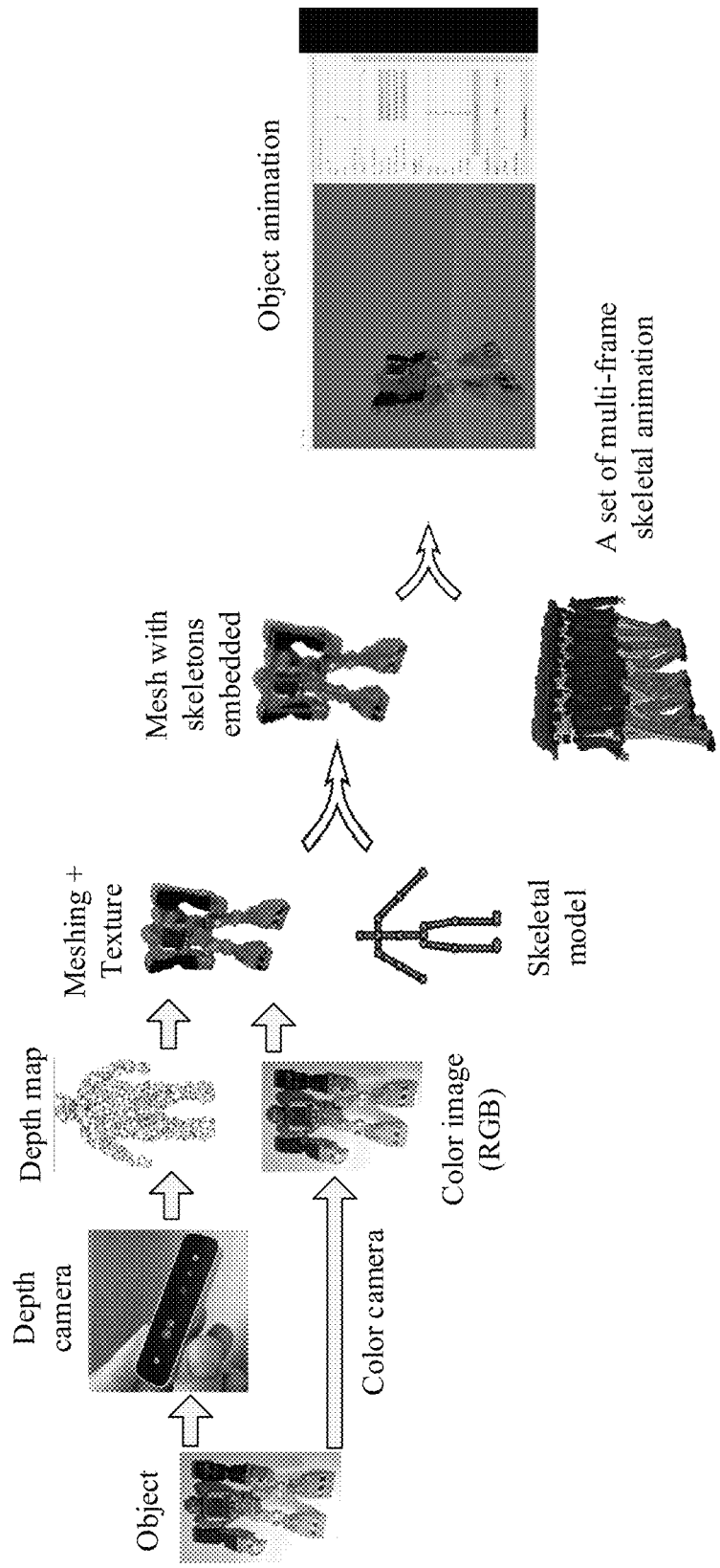
FIG. 3 shows a main process from object scanning to animation implementation according to an embodiment of the present invention.

FIG. 3 shows a main process from object scanning to animation implementation. First, an object is scanned, to obtain a depth map by using the depth camera and obtain a color image by using the color camera; fusion is performed on the depth map and the color image to obtain a textured meshing model, that is, a 3D model of the object; and the 3D model is embedded into a skeletal model to, to animate the skeletal model according to a skeleton animation (it should be understood that movement of skeletons is usually invisible, but certainly may be visible to a user under special scenario requirements), so as to visually present an animation effect of the object. The following provides detailed descriptions with reference to examples.

Operation 21 relates to depth camera scanning, color camera scanning, and 3D reconstruction. Specific examples are as follows.

Deep Camera Scanning

The depth camera may include a 3D/depth sensor or a 3D/depth sensor module, and is configured to obtain depth information of a static object. It should be understood that a scanned object should be a static object theoretically, but slight dynamics are acceptable to some extent during an actual operation. The depth information may be obtained by using a structured light technology and TOF. With emergence of a method for obtaining the depth information, the depth module may further include more implementations, and this is not limited in the present invention.

Figure 4:
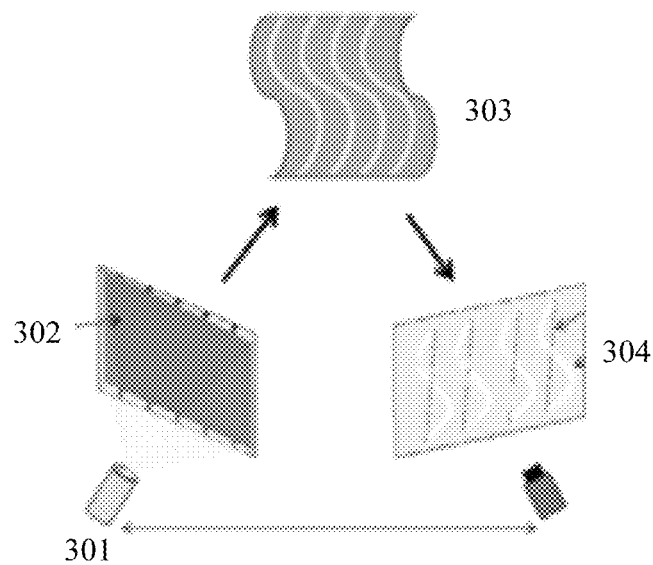
FIG. 4 is a schematic diagram of structured light according to an embodiment of the present invention.

A diagram of a structured light principle is shown in FIG. 4. 301 represents an invisible infrared light source, 302 represents a raster that generates a specific light pattern, 303 represents a scanned object, and 304 represents an infrared camera. The light pattern reflected by 303 is obtained, and compared with an expected light pattern, depth information of a scanned part of the target object is obtained through computation.

Figure 5:
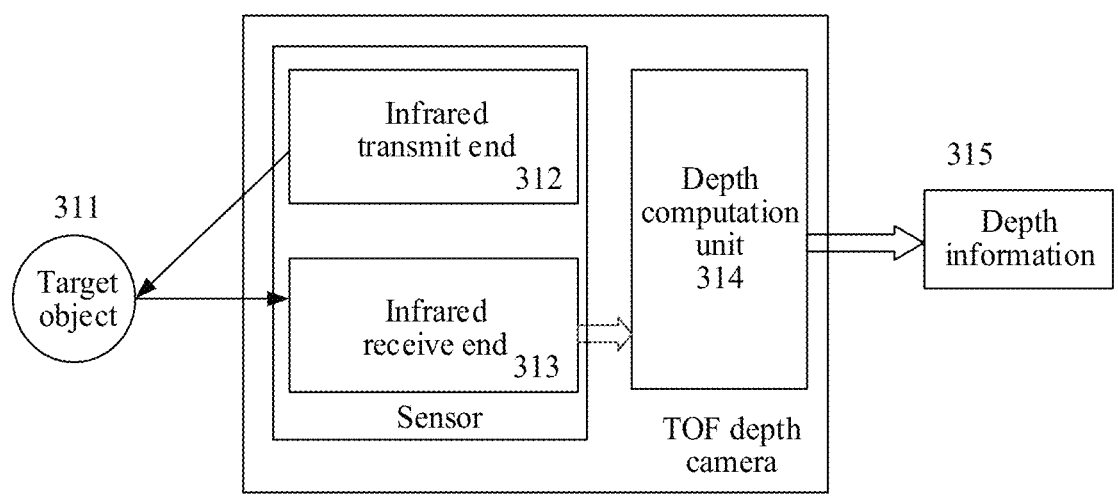
FIG. 5 is a schematic diagram of TOF according to an embodiment of the present invention.

FIG. 5 shows a TOF depth camera. 311 represents a target object, 312 represents an infrared transmit end in the TOF camera, and 313 represents an infrared receive end. When 312 transmits infrared light (the light may be with a wavelength ranging from, for example but not limited to, 850 nm to 1200 nm) to the target object, the target object reflects the infrared light, and the reflected infrared light is received by 313. A sensor (the sensor may be, for example but not limited to: a CMOS array or a CCD array, with a resolution higher than 240×180) in 313 generates a series of voltage difference signals due to the reflected infrared light. A depth computation unit 314 performs computation based on the series of voltage difference signals, to finally obtain depth information 315 of the scanned part of the target object.

Color Camera Scanning

In the process of scanning the target object, the depth camera and the color camera are synchronously invoked, to make images of the target object correspondingly scanned by the depth camera and the color camera consistent by using a specific calibration and correlation algorithm. A manner of obtaining an image by the color camera during scanning is basically consistent with a manner of taking images by using a common camera, and details are not described in this part.

In a specific implementation process, the target object needs to be scanned within a specific angle range (which is usually restricted by a smaller one of field of views of the depth camera and the color camera) and a specific distance. Restricted by quality of the depth information (for example, a depth map), the object is usually scanned at a distance of 20 cm to 80 cm from the depth camera (or the mobile terminal).

A specific scanning manner may be as follows: keeping the terminal still, holding and placing the target object in front of the depth camera at a distance of 30 cm to 70 cm, and slowly rotating the object in all-round directions, until a union set of all scanned images can be used to construct the complete object. It should be noted that a surface of the object should not be blocked when the object is held.

A specific scanning manner may be as follows: keeping the object still, holding and placing the terminal in front of the depth camera at a distance of 30 cm to 70 cm, and performing panoramic scanning on the object, until a union set of all scanned images can be used to construct the complete object. It should be noted that a surface of the object should not be blocked when the terminal is held.

A specific scanning manner may be as follows: keeping the object still, holding and placing the terminal in front of the depth camera at a distance of 30 cm to 70 cm, and scanning the object at an interval of a preset angle, until a union set of all scanned images can be used to construct the complete object. It should be noted that a surface of the object should not be blocked when the terminal is held.

In one embodiment, capturing may be performed for a plurality of times, to ensure that an entire scene is captured. Scene information includes a full view of the object. Therefore, in the panoramic scanning process, there may be correspondingly a plurality of frames of depth maps (a sequence of depth maps), and each depth map corresponds to a scene within a scanning range during one scanning. There may be also correspondingly a plurality of frames of color images (a sequence of color images), and each color image corresponds to a scene within a scanning range during one scanning. When the target object is scanned, another object may also be included. However, if scanning is performed at the foregoing moderate distance, noise other than the target object may be removed in a subsequent 3D reconstruction process.

In one embodiment, a shooting frame rate of the depth camera in the scanning process may be greater than or equal to 25 fps, for example, 30 fps, 60 fps, or 120 fps.

In one embodiment, in the scanning process, the terminal may present a scanning progress of the target object, so that the user observes whether a panorama of the target object is covered, and the user can autonomously choose to continue scanning or stop scanning.

Because the depth camera and the color camera may be front-faced or rear-faced, there are correspondingly two manners of front-facing scanning and rear-facing scanning. If the depth camera is located in an upper part of a front side of the mobile phone, the depth camera may be used together with a front-facing color camera, and the front-facing scanning can implement selfie scanning. If the depth camera is located in an upper part of a rear side of the mobile phone, the depth camera may be used together with a rear-facing color camera. In the rear-facing scanning, more target objects may be selected, so that the target object is finely and stably scanned. It should be understood that physical positions of the depth camera and the color camera may change with emergence of a foldable-screen terminal. Therefore, the conventional concepts of front-facing and rear-facing should not constitute any limitation on physical positions. When the object is scanned for 3D modeling, to ensure image consistency, the depth camera and the color camera may be located on one side, and neither a position nor a direction relative to the terminal is not limited, provided that 3D reconstruction can be implemented by using any combination manner of camera positions. In a possible implementation, the terminal may further invoke a third-party shooting device, for example, an externally-connected shooting rod, a scanner, or an externally-connected camera. Optionally, an external color camera may be used, or an external depth camera may be used, or both may be used.

The foregoing color camera scanning and depth camera scanning may be enabled when the user triggers a scanning function. Trigger operations include timing, shutter triggering, a gesture operation, mid-air sensing, device operation control, and the like. In addition, when the user enables the camera for preview, a system may prompt which objects among preview images are suitable for scanning or 3D modeling. For example, a square box may be used to identify an object in the preview images to prompt the user.

In addition, specific device parameters related to the depth camera and the color camera are related to a manufacturing process, a user requirement, and a design constraint of the terminal. This is not specifically limited in the present invention.

3D reconstruction (meshing+texture mapping)

Figure 6:
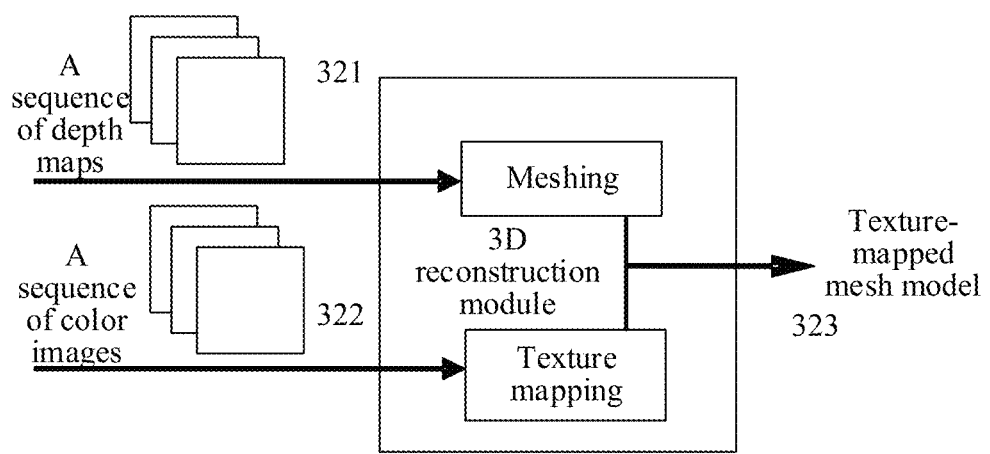
FIG. 6 is a flowchart of a meshing+texture mapping method according to an embodiment of the present invention.

As shown in FIG. 6, after multi-frame 360-degree panoramic scanning is performed on the object, a sequence of depth maps 321 and a sequence of color images 322 are obtained. Each frame obtained by the depth camera is a depth map (for example, a Depth map) of a scanned scene, and each frame obtained by the color camera is a color image (for example, an RGB image) of a scanned scene. Meshing processing is performed on the sequence of depth maps 321 to obtain a mesh (Mesh) model of the target object, and texture mapping is performed on the mesh model based on the sequence of color images 322 to obtain a texture-mapped mesh model 323, that is, the 3D model of the object. In a possible implementation, texture mapping may also be performed based on all frames or some frames in the sequence of color images.

(1) Meshing

Figure 7:
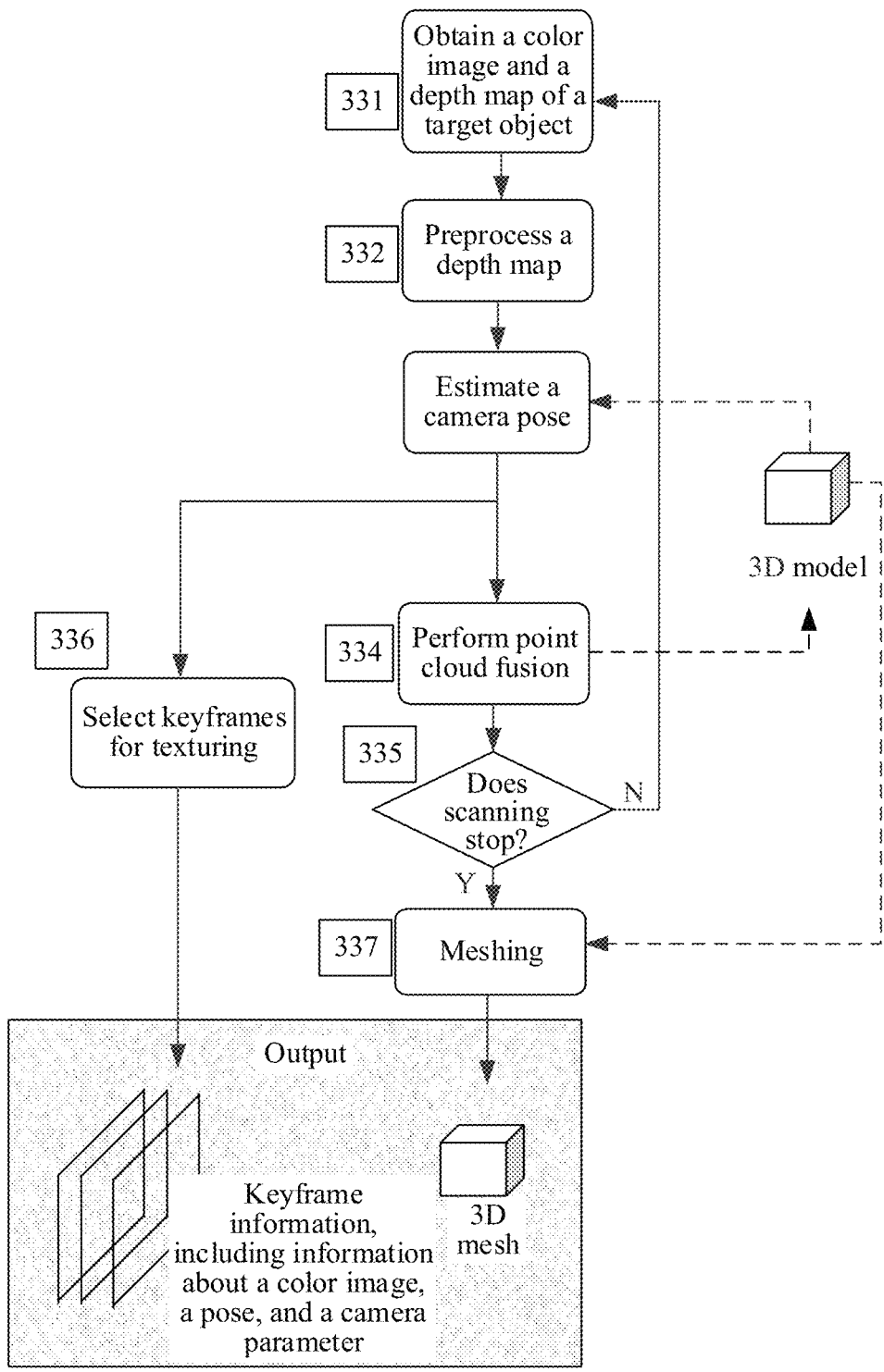
FIG. 7 is a flowchart of a specific meshing implementation solution according to an embodiment of the present invention.

In one embodiment, referring to FIG. 7, a specific meshing implementation solution is as follows:

Operation 331: Obtain a color (including but not limited to RGB) map and a depth (Depth) map of the target object in each scanning scene. The depth map (depth map) is information related to distances between the depth camera and a plurality of points on a surface of the target object. The depth map is similar to a grayscale image, except that a pixel value of the depth map represents an actual distance between the depth camera and one point on the surface of the target object. Generally, the color image and the depth map are registered.

Operation 332 includes but is not limited to: performing bilateral filtering and denoising on the depth map, performing downsampling on the depth map to generate an image pyramid with different resolutions, converting the depth map into a point cloud, estimating a normal vector of each vertex, and cropping a point outside a range of the scanned object.

Operation 333: In operation 332, if an object model needs to be generated for collected a sequence of depth maps and a sequence of color images of the target object at different scanning positions, a single-frame 3D point cloud obtained in the collected map sequences needs to be converted into a unified coordinate system. In other words, a pose transformation relationship between different scanned positions of the object, that is, pose estimation, is obtained. The pose estimation is to estimate a 3D pose of an object based on a map sequence. The pose estimation may be performed based on the following two thoughts: feature-based registration and point cloud-based registration. When transformation of the object is performed by a relatively small angle for map sequences, fine point cloud-based registration is used. For example, an iterative closest point (iterative closest point) ICP algorithm may be used for pose estimation of the object.

When transformation of the object is performed by a relatively large angle for map sequences, coarse registration may further be performed between two poses based on a 3D feature of the object, and a result of the coarse registration is used as an initial value of the fine registration. This manner can support a higher-rate scanning.

If no measurement error exists, 3D points of a current frame are all on a surface of a 3D volumetric model (volumetric model) of the target object. Therefore, to solve a camera pose (a pose transformation relationship), it is transformed to solve a minimum value of a distance between the 3D point cloud of the current frame and a point cloud on the surface of the 3D volumetric model of the target object. A target function is as follows:

$$M_{opt} = \mathrm{argmin}_M \sum_i ((M \cdot s_i - d_i) \cdot n_i)^2.$$

M represents a pose transformation matrix of the camera, $s_i$ represents a 3D point cloud of a frame of a currently-to-be-computed pose, where the point cloud is transformed to a view coordinate system of the volumetric model, $d_i$ represents a point cloud of the model in the view coordinate system, $n_i$ represents a normal line corresponding to a model point cloud, and the target function means to compute a minimum quadratic sum of a distance from the point cloud of the current frame to a plane on which a point cloud of the volumetric model is located.

Operation 334: Convert the 2D depth map into 3D information and perform fusion on the 3D information to the unified 3D volumetric model. A truncated signed distance function (TSDF) algorithm is used. A fused voxel value is an SDF (signed distance function) value, a weight (weight) value, and an optional color value. The TSDF algorithm is currently a mainstream processing algorithm for 3D point cloud fusion. The weight is computed through averaging. An old weight value increases by 1 each time when fusion is performed, and a new weight value is 1. A new SDF value and an old SDF value are respectively multiplied by respective weights, obtained products are summed up, and a sum of the products is divided by a quantity of times of fusion (the new weight value), and in this way a new normalized SDF value is obtained.

Operation 335: Determine whether a preset quantity of keyframes are stored at intervals of a specific angle (for example, but not limited to a preset angle such as 30 degrees, 45 degrees, 60 degrees, and 90 degrees) in three directions: roll/yaw/pitch; if the quantity of stored keyframes is less than the preset quantity (which is subject to whether a panoramic view of the target object is covered), continue to capture a scene (a color image and a depth map), where the terminal instructs the user to perform more scanning; and if the quantity of keyframes is sufficient to cover the panoramic view of the target object, the user is prompted that scanning completes and a following operation may proceed.

Operation 336: In a real-time fusion process, select and buffer input keyframe information required for texture mapping, where the information includes a color image, a pose (a difference of position poses between different maps), and the like. As object modeling requires a feature of 360-degree scanning, a preset quantity (N) of keyframes are selected in each of the roll, yaw, and pitch directions, so that a 360-degree texture of the object can be completely restored. For example, an angle (YAW/Pitch/Roll) of each frame in an input image stream is determined based on an ICP result, a definition of each frame is computed, and a selection policy is constructed based on the angle and the definition to select a keyframe.

An angle policy is that 360 degrees are divided into 360/N areas in different directions, and there needs to be a frame of a clear color image in each area.

A blur detection principle is that a gradient method and a sobel operator are usually used for image blurriness evaluation. The gradient method may be selected for blurriness computation. As shown in the following formula, a pixel in an image, together with two pixels on the right of the pixel and on a lower side of the pixel, is computed as follows:

$$\det_x = a(i+1, j) - a(i, j)$$
$$\det_y = a(i, j+1) - a(i, j)$$
$$\mathrm{sum} = \sum_{i=0, j=0}^{i=width-1, j=height-1} \left(\sqrt{(\det_x^2 + \det_y^2)} + |\det_x| + |\det_y|\right)$$
$$\mathrm{blur} = \mathrm{sum}/(width * height).$$

A larger blur value indicates a clearer image.

Operation 337: Use a marching cubes algorithm to implement 3D point cloud meshing, to generate a triangular face. A main idea of the marching cubes algorithm is to search for, by cells, a boundary between a content part and a background part in the 3D point cloud, and extract a triangular facet from the cell to fit the boundary. Briefly, voxel points including voxel data content are referred to as real points, and all background voxel points beyond the real points are referred to as imaginary points. In this way, a three-dimensional point cloud is a dot matrix composed of various real points and imaginary points. For example, from a perspective of a single cell, each of eight voxel points of the cell may be a real point or an imaginary point, and therefore there may be a total of 2 to the power of 8, that is, 256 possible cases for one cell. A core idea of the marching cubes algorithm is to use the 256 enumerable cases to extract equivalent triangular faces from the cell. A cell is a cube pane composed of eight adjacent voxel points in a three-dimensional image. Semantics of "cube" in the marching cubes algorithm may also mean the cell. It should be noted that there is a difference between the cell and the voxel: The cell is a cube pane composed of eight voxel points, while each cell (except ones at a boundary) is shared with eight cells.

(2) Texture Mapping

Figure 8:
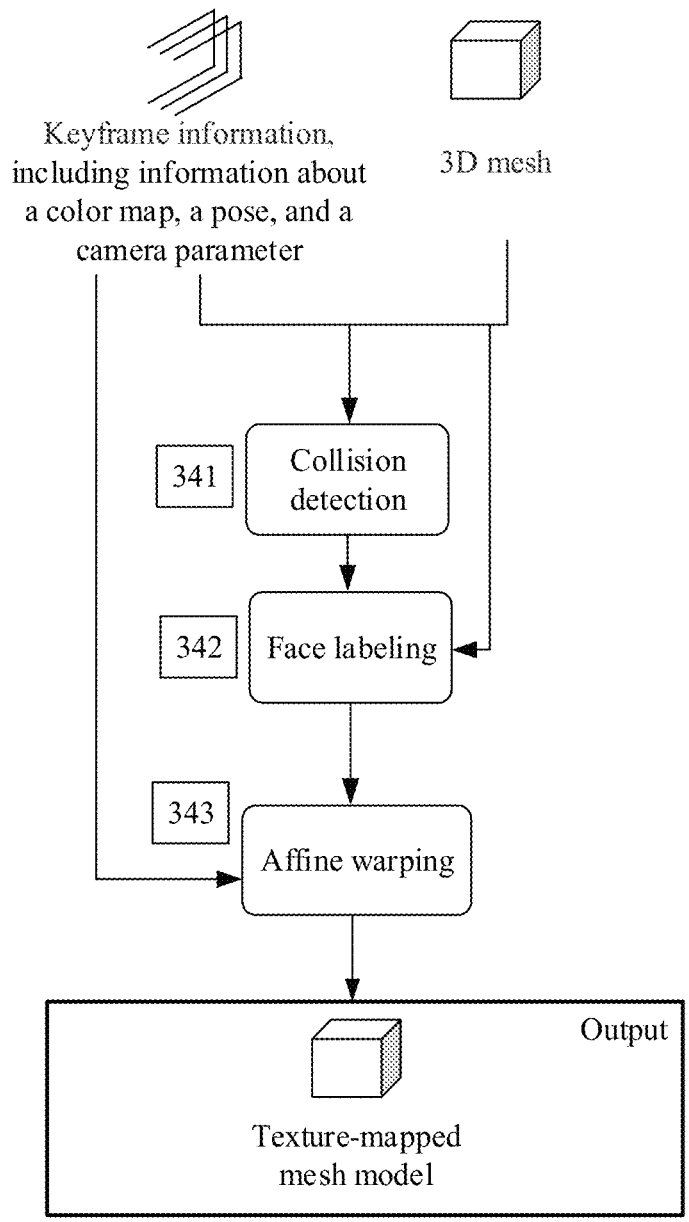
FIG. 8 is a flowchart of a specific texture mapping implementation solution according to an embodiment of the present invention.

In one embodiment, referring to FIG. 8, a specific texture mapping implementation solution is as follows:

Operation 341: Determine, according to the mesh model (triangular face information) and pose information of keyframes, whether all faces in a pose of each keyframe are visible. Information about all triangular faces of the mesh model and spatial coordinates of the keyframes are input, and information about whether all the triangular faces are visible in the pose of each keyframe is output.

The principle is described as follows: if it needs to determine whether a triangular face is visible or invisible in a specific pose, it needs to determine whether a radial line formed by connecting the pose and a vertex of the triangular face intersects another triangular face of the model. If yes, it indicates that the triangular face is blocked by another face, and the triangular face is invisible; otherwise, the triangular face is visible in the pose.

A collision detection process relates to the following content: computation of a normal vector of a triangle, determining whether a radial line intersects the triangle, determining whether the radial line intersects an AABB (Axis-aligned bounding box), and construction of a hierarchical binary tree.

A specific example processing procedure is as follows:

(1) Take a vertex of the face, and connect the vertex to a camera viewpoint of a current keyframe view to obtain a ray.

(2) Compute, starting from a root of a hierarchical binary tree, whether blocking exists for the radial line.

(3) Determine whether a BV (Bounding Volume) node is a leaf node, and if the BV node is a leaf node, proceed to step (6).

(4) Determine whether the radial line intersects the AABB bounding box of the BV, and if not, go back to (1).

(5) If the radial line intersects the BV, select two sub-nodes of the BV, and go back to (3).

(6) If the BV node is a leaf node, first determine whether the radial line intersects the AABB bounding box; if yes, determine whether the radial line intersects the triangle; and if yes, determine that the vertex is blocked.

(7) If one or more vertices of the face are blocked, the face is invisible in the current keyframe view.

Operation 342: Label each face (face) on the mesh model based on a result in operation 341 and the mesh model by using region segmentation and graph cut (Graph Cut) methods, and determine to select a specific keyframe view (view) to generate a texture, where a face labeling result may be used as an input of an affine mapping (Warping) module, and is used to generate a preliminary texture map.

Operation 343: Map a texture of a corresponding region in the keyframe view to the texture map, and perform boundary smoothing on a patch (patch) between different keyframes.

Because the 3D model of the object is a texture map generated by using a plurality of keyframe views, after the keyframe views are selected, much color discontinuity exists between seams generated between different keyframe views on the texture map. At the texture discontinuity, each vertex Vertex may be considered as two vertices: a Vleft belonging to a left face and a Vright belonging to a right face. A before-adjustment color of each vertex V is denoted as G, and a corrected-color value $g_v$ of each vertex V is obtained according to the following minimization equation:

$$\operatorname*{argmin}_{g}\left[\left(\sum_{v}(f_{v_{left}}+g_{v_{left}}-(f_{v_{right}}+g_{v_{right}}))^2 + \frac{1}{\lambda}\sum_{v}(g_{v_i}-g_{v_j})^2\right)\right],$$

where argmin means to take a minimum difference value, and the foregoing formula includes two the following two parts:

1. $\sum_{v}(f_{v_{left}}+g_{v_{left}}-(f_{v_{right}}+g_{v_{right}}))^2$; and

2. $\frac{1}{\lambda}\sum_{v}(g_{v_i}-g_{v_j})^2$.

In the first part, v represents a vertex (Vertex) in a seam between keyframes, that is, the vertex belongs to both a left patch and a right patch. $f_{v_{left}}+g_{v_{left}}$ represents the before-adjustment color value, and $g_v$ represents the corrected-color value, that is, an increment ($\Delta$). This formula is used to make a corrected difference of a common point between different frames of images be as small as possible, to ensure smoothness in the seam. In the second part, $V_i$ and $V_j$ mean that increments of any two adjacent vertices on a same texture patch need to be as small as possible, to avoid unsmoothness resulting from that one increment is excessively large while the other is excessively small.

In one embodiment, adjacent regions with same labels in the face labeling result are stored as a patch, boundary smoothing is performed on vertices of all patches, a pixel value of each vertex is adjusted, and position- and pixel-based affine transformation is performed on a triangle enclosed by final vertices, to obtain the final texture map.

Figure 9:
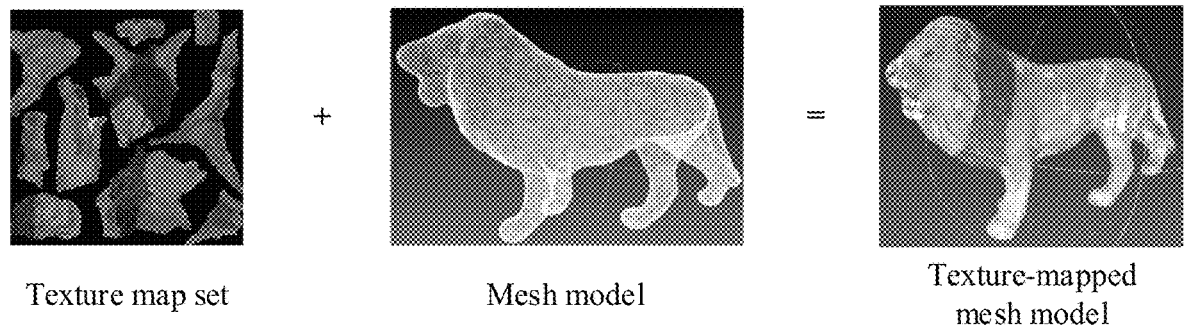
FIG. 9 shows a specific meshing+texture mapping instance according to an embodiment of the present invention.

The 3D model of the object is obtained by drawing a texture map set of the object on a surface of the mesh model of the object, and is usually stored in an .obj format. As shown in FIG. 9, for example, a texture map set of a lion is mapped into a mesh model of the lion, and a texture-mapped 3D model of the lion is obtained.

Operation 22

The 3D model of the target object obtained after 3D reconstruction, that is, a textured mesh model, is obtained by performing operation 21. Next, skeletons need to be embedded into the textured mesh model. The following describes how to obtain a skeletal model, that is, a target skeletal model.

In one embodiment, a skeletal model production library may be provided for the user, for example, some line segments and points, where the line segments represent skeletons, and the points represent joint nodes. An operation instruction of the user, for example, a gesture, a slide, or a shortcut key, is received; and at least two line segments and at least one point are combined into a skeletal model, to obtain the skeletal model. Further, the skeletal model is uploaded to a cloud or is locally stored.

In one embodiment, a more open production library may be provided for the user, and a line segment and a point are completely freely designed by the user, where the line segment represents a skeleton, and the point represents a joint node. An operation instruction of the user, for example, a gesture, a slide, or a shortcut key, is received; and at least two line segments and at least one point are combined into a skeletal model, to obtain the skeletal model. Further, the skeletal model is uploaded to a cloud or is locally stored.

In one embodiment, the skeletal model with a highest degree of matching with a shape of the target object may be selected as the target skeletal model from the at least one preset skeletal model. The preset skeletal model may be stored in a network or a cloud, or may be locally stored. For example, a chicken skeletal model, a dog skeletal model, and a fish skeletal model are locally stored. When the target object is a duck, a system uses the chicken skeletal model as the target skeletal model through appearance recognition. A criterion for determining similarity includes but is not limited to a skeleton form, a skeleton length, a skeleton thickness, a skeleton quantity, a skeleton composition manner, and the like.

In one embodiment, a selection instruction of the user may be received, and the selection instruction is used to select the target skeletal model from the at least one preset skeletal model.

Operation 23

Fusion is performed on the target skeletal model and the 3D model of the target object, or the target skeletal model is embedded into the 3D model of the target object. A position of the skeletal joint node of the object/object needs to be computed, so that a final skeletal framework maximally conforms to an internal structure of the target object, and looks similar to a preset (given) skeletal framework as much as possible.

Figure 10:
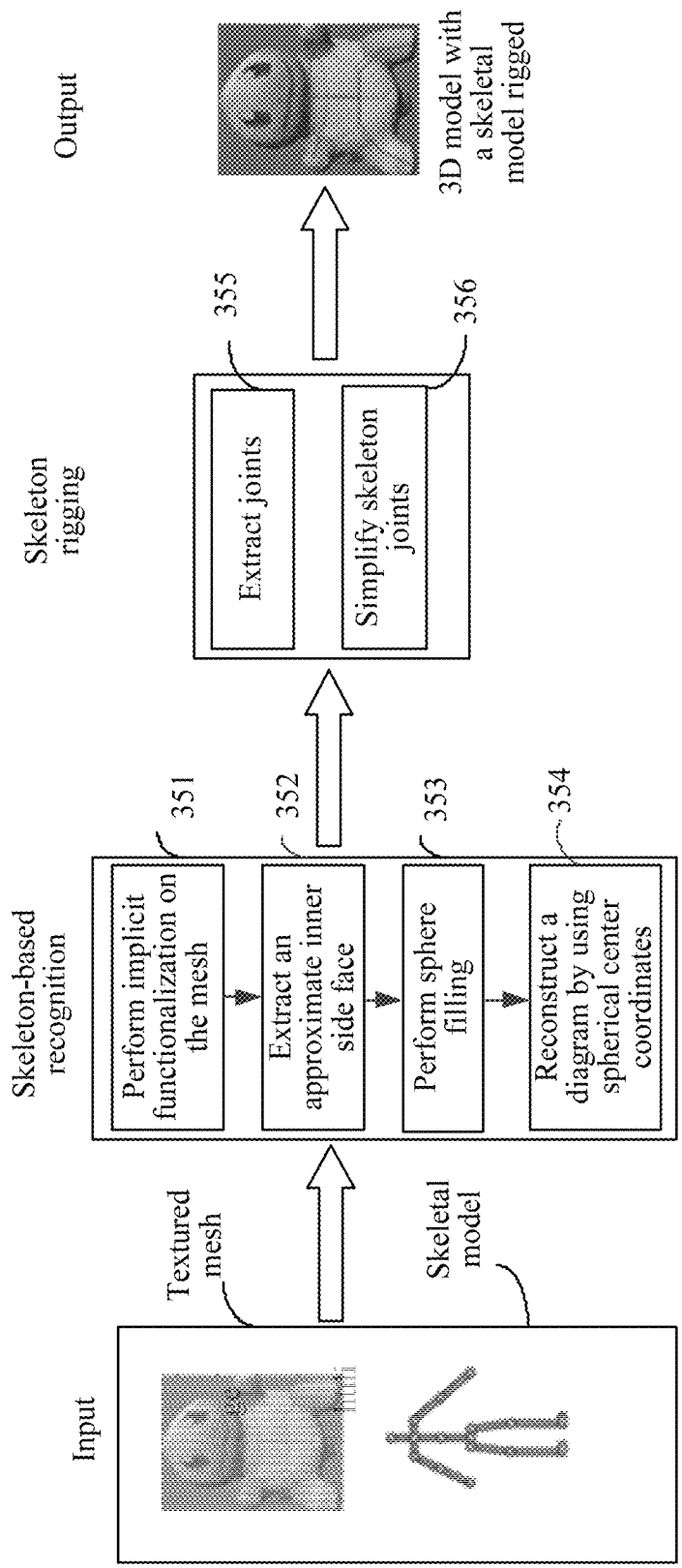
FIG. 10 is a flowchart of a specific skeletal rigging solution according to an embodiment of the present invention.

In one embodiment, referring to FIG. 10, a specific skeletal rigging solution is as follows:

Operation 351: Compute, by using other computations, adaptively sampled distance fields (adaptively Sampled Distance Fields) of a trilinear interpolation to approximate a medial axis surface. A k-d tree (K-dimensional tree) may be constructed to evaluate a signed distance from any point to a surface of the object. The k-d tree is a data structure for partitioning a k-dimensional data space, and is mainly used for search of key data in a multi-dimensional space.

Operation 352: Compute a group of sample points that are approximately located on the medial axis surface of the object, find a point at which a skeletal joint may be located, and filter out points that are close to the surface of the object.

Operation 353: To select a vertex of a skeleton diagram from the medial axis surface, fill a sphere in the object, sort all points along a medial axis surface based on distances from the surface of the 3D model, draw a largest inscribed sphere inside the 3D model (within a surface range of the 3D model) starting from a farthest point to obtain a radius of the sphere, traverse all points along the medial axis line, where the inscribed sphere is constructed by using a point only if the point is not included within any previously added sphere.

Operation 354: Construct the skeleton diagram by connecting some sphere centers, and use an edge between sphere centers connecting any two intersected spheres as an edge.

Operation 351 to operation 354 may be referred to as skeleton-based recognition.

Operation 355: Extract the preset skeletal model, and optimally embed the skeletal model into the geometric skeleton diagram G=(V, E) that is constructed in operation 354 (where V represents a vertex, and E represents an edge). Usually, nodes need to be reduced, and a skeletal framework needs to be optimized.

Operation 356: Identify a skeletal hierarchy relationship and reduce simple hierarchies to approximate a skeletal shape.

After skeleton rigging (operation 355 and operation 356), the 3D model of the object with the rigged skeletal model can be obtained.

Operation 24

The 3D model into which the skeletal model is embedded is obtained in operation 23. Next, some implementable movement manners need to be found for the skeletal model, to animate the 3D model of the target object. The following describes how to obtain a movement manner of a skeleton (or intuitively referred to as animation), that is, the target movement manner.

In one embodiment, a movement manner of a first object may be obtained, and the movement manner of the first object is used as the target movement manner. The first object may be an object that currently moves in real time (for example, a person that is running is captured, and a skeletal movement manner of the object is extracted by using a neural network). Alternatively, the first object may be a movement manner that is of an object and that was captured and stored (for example, a set of lovely actions of a dog were captured, and by using an algorithm, a movement manner of the actions was locally stored or stored in a cloud). Alternatively, the first object may be a preset movement manner of a specific object (for example, only a human-related movement manner is selected).

In one embodiment, one of the preset target movement manners may be selected (for example, a person's action, a dog's action, a cat's action, a horse's action, and the like are locally stored, and the user may select a specific category based on a preference of the user or a conformity degree of an object type).

In one embodiment, the movement manner may be made by the user by using animation production software. Certainly, the software may be a toolkit embedded in a system, or a toolkit loaded in an app for scanning and movement rebuilding, or may be from a third-party animation design tool. The movement manner may be a movement manner or animation that was historically made or is currently made.

In one embodiment, the movement manner may be that a movement manner with a highest attribute matching degree is selected as the target movement manner from a plurality of prestored movement manners based on a physical attribute. For example, fish's swimming animation, frog's jumping animation, and horse's running animation are locally prestored. If the target object scanned by the user is a deer, the horse's running animation is used as a target movement manner of the deer (compared with a fish or a frog, a horse is more similar to a deer in appearances, biological species, and skeletal structures).

In one embodiment, the movement manner may alternatively be that the system or the user self-designs a skeletal model based on the skeletal model (which may be obtained by using any method in the foregoing step) of the target object, to obtain the target movement manner. Such a manner is a most appropriate animation operation for subsequently implementing animation on the 3D model of the object.

In one embodiment, the movement manner may be preset skeletal animation, and is usually made by a professional animation designer.

It should be understood that the skeletal animation describes a dynamic change of each node in the skeletal framework over time, and is usually stored and represented in keyframe form. Generally, a concept of frame per second (FPS) is used, which means a quantity of frames contained in one second. The skeleton animation cannot exist departing from the skeletal framework; otherwise the 3D model cannot be driven. Therefore, the skeletal animation usually exists depending on a specific skeletal framework. The skeletal framework is usually referred to as rig, and describes skeletons contained in a set of skeletal framework, a splicing relationship between all the skeletons, a default transformation of each skeleton (that is, a pose), and other additional information. A pose describes a static state after transformation of each node in the skeletal framework, such as a frame of standing or running. Each skeletal framework stores a binding pose, which is a default pose when the skeletal framework is made. A pose generally does not store a hierarchy relationship of the skeletal framework, but uses an array to sequentially store transformation of each node. The node belongs to a specific skeleton, and therefore cannot be used departing from the skeletal framework. In addition, the pose is a part of a sampling result of the skeletal animation. It can be learned that the skeletal framework, the pose, and the skeletal animation are associated with each other, which jointly implement a subsequent animation operation.

Operation 25

The skeletal animation essentially records dynamics of positions, rotation, and scaling, of a series of objects, that are changed over time and that are stored based on a tree structure. Each object is a skeleton. The animation is implemented as follows: Skeleton animation transformation in a set of animation is mapped into the 3D model in which skeletons are rigged in the previous step "automatic skeletal rigging", where a mapping implementation of such an action includes but is not limited to a game engine, an animation engine, and the like; pose transformation is performed on the 3D model based on the skeleton transformation, where the pose transformation coherently is a series of animation actions. For the user, the scanned object is visually "revitalized" and the static object is "animated". In the animation implementation process, a skinning (skinning) technology is a basis of ensuring that the object 3D model is animated with the skeletal model.

The animation of the 3D model of the object is represented as that the 3D model rigged with skeletons is mapped into a set of changing actions of the skeletal model. For each frame, deformation needs to be implemented on the surface of the 3D model (that is, an epidermis of the 3D model of the object) based on a change of a skeleton. Such a process is referred to as skinning. Therefore, this implements mapping from the 3D model to actions, thereby achieving an animation effect.

In one embodiment, a linear blending skinning (LBS) solution may be used. For any point on the surface of the 3D model, a current-state position may be obtained based on a previous-state position by using the following formula. $v_i$ represents the previous-state position, $v_i^t$ represents the current-state position, $W_{i,j}$ represents a weight of a $j^{th}$ skeleton at a point i, and $T_j$ represents a transformation matrix. After a specific quantity of vertices $w_{ij}$ are determined according to a transformation matrix, point-point transformation is implemented, and therefore transformed 3D model is determined, so as to implement the animation. A core of the skinning technology is to find a weight of each vertex corresponding to each skeleton.

$$v_i^t = \Sigma_{j=1}^m w_{i,j} T_j v_i$$

In one embodiment, the weight may be computed in a manner similar to heat equilibrium. The 3D model is considered as an insulated heat-conducting body, a temperature of the $i^{th}$ skeleton is set to 1° C., and temperatures of all of the other skeletons are set to 0° C. According to the heat equilibrium principle, a temperature obtained after equilibrium of a vertex on the surface may be set as a weight of the point, and a weight value ranges from 0 to 1. Using the heat equilibrium-based weight computation method makes a weight computation result smooth, and makes a presented action effect more real and natural.

It should be understood that, action transformation of the 3D model of the object is implemented by changing a position of an embedded skeleton (that is, through animation), and a skinning effect is visually presented to the user. Unless otherwise set, the user may also be allowed to see the skeletal animation, in absence of the 3D model of the object.

Figure 11:
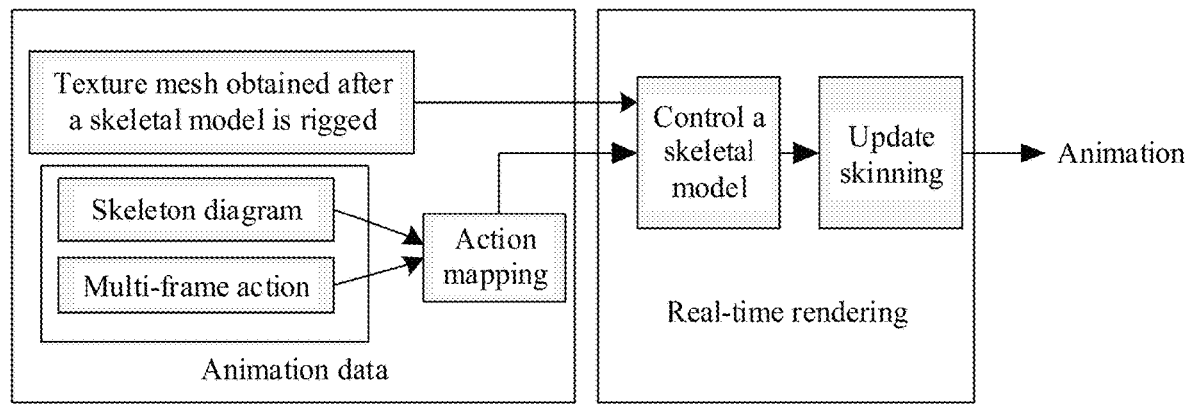
FIG. 11 is a specific animation flowchart according to an embodiment of the present invention.

A specific animation process may be shown in FIG. 11. By using a preset skeleton diagram and a multi-frame action, that is, according to a movement model or an animation model, action mapping is performed on the 3D model into which the target skeletal model is rigged, the target skeletal model is controlled to animate the target skeletal model according to the preset movement model. In the animation process, computation is performed and skinning data is updated in real time, so that the 3D model can implement smooth movement with the target skeletal model, thereby implementing the animation of the 3D model. It should be understood that the skeletal model of the target object may not be completely the same as a skeletal structure of the animation. Therefore, position mapping may be performed between the skeletal model of the object and the skeletal structure of the animation. For example, key nodes need to be consistent, and a skeleton length may be proportionally set. Alternatively, the skeletal model of the object and the skeletal structure of the animation may be adapted to each other, for example, proportional cutting and extending may be performed, to make that at least the skeletal structure of the animation does not exceed an outer surface of the 3D model of the object. Further, some physical operations may be performed to trim and adjust the skeleton of the animation, to make the skeleton of the animation maximally supports of the 3D model of the object, so that the skeletal model of the animation is more harmonious with the 3D model of the object.

The foregoing operation 21 to operation 25 may be completed step by step in a one-off manner, or may be performed at a specific interval. For example, after scanning the object to obtain the 3D model, the user may locally store the 3D model or store the 3D model in a cloud, and may directly invoke the 3D model after a period of time, to freely select skeleton rigging or freely select an animation manner, or may further select an animation background, including but not limited to a real-time captured image, a locally-stored image, a data image in the cloud, and the like. In addition, a shadow of the object may further be displayed or a sound effect, a special effect, or the like may be added while animation of the object is displayed on the terminal. The animation may be automatically played by the mobile terminal, or may be controlled to be played by inputting an operation instruction by the user.

It should be understood that the foregoing embodiments are merely some optional implementations of the present invention. In addition, because camera parameter designs, algorithm implementations, user settings, terminal operating systems, environments in which the terminal is located, and use habits of users are different, the device parameter, the method used by the user, and the related algorithm in the embodiments mentioned above each have a plurality of variations. These cannot be listed one by one through enumeration, and persons skilled in the art should understand that, the technical solutions generated through adaptive adjustment based on the foregoing theory, including some replacements of conventional manners, shall fall within the protection scope of the present invention.

According to the present invention, integration of a series of operations such as scanning, 3D reconstruction, skeletal rigging, and preset animation display for the target object can be implemented on the mobile terminal. For the user, 3D scanning can be easily performed. In addition, with wide application of a shooting technology of the mobile terminal, transition from presenting a 2D image to presenting 3D animation can be implemented, and the user is allowed to finally implement a virtual animation action for an object that is actually scanned and modeled. This greatly increases interest in using the mobile terminal by a user, improves user stickiness, and leads the shooting application to a new trend.

Figure 12:
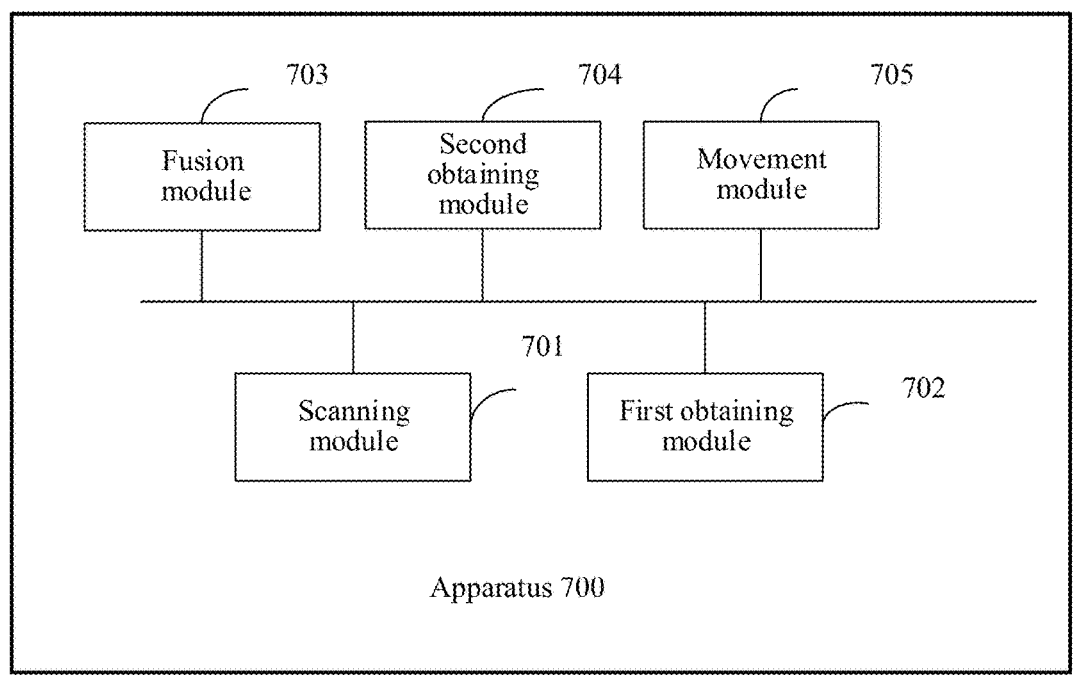
FIG. 12 is a schematic diagram of an object modeling and movement apparatus according to an embodiment of the present invention.

Based on the object modeling and movement method provided in the foregoing embodiments, an embodiment of the present invention provides an object modeling and movement apparatus 700. The apparatus 700 may be applied to various shooting devices. As shown in FIG. 12, the apparatus 700 includes a scanning module 701, a first obtaining module 702, a fusion module 703, a second obtaining module 704, and a movement module 705. The apparatus is applied to a mobile terminal, the mobile terminal includes a color camera and a depth camera, and the color camera and the depth camera are located on one side of the mobile terminal. For related features, refer to descriptions in the foregoing method embodiments.

The scanning module 701 is configured to perform panoramic scanning on the target object by using the color camera and the depth camera, to obtain a 3D model of a target object. The scanning module 701 may perform enablement control on the color camera and the depth camera by a processor by invoking a program instruction in a memory. Further, images collected during scanning may be selectively stored in the memory.

The first obtaining module 702 is configured to obtain a target skeletal model. The first obtaining module 702 may be implemented by the processor by invoking a corresponding program instruction. Further, the first obtaining module 702 may be implemented by invoking data and an algorithm in a local memory or a cloud server to perform corresponding computation.

The fusion module 703 is configured to fuse the target skeletal model and the 3D model of the target object. The fusion module 703 may be implemented by the processor by invoking a corresponding program instruction. Further, the fusion module 703 may be implemented by invoking data and an algorithm in the local memory or the cloud server to perform corresponding computation.

The second obtaining module 704 is configured to obtain a target movement manner. The second obtaining module 704 may be implemented by the processor by invoking a corresponding program instruction. Further, the second obtaining module 704 may be implemented by invoking data and an algorithm in the local memory or the cloud server to perform corresponding computation.

The movement module 705 is configured to control the target skeletal model in the target movement manner, to animate the 3D model of the target object in the target movement manner. The movement module 705 may be implemented by the processor by invoking a corresponding program instruction. Further, the movement module 705 may be implemented by invoking data and an algorithm in the local memory or the cloud server to perform corresponding computation.

In one embodiment, the scanning module 701 is specifically configured to perform the method mentioned in operation 21 and an equivalent replacement method. The first obtaining module 702 is specifically configured to perform the method mentioned in operation 22 and an equivalent replacement method. The fusion module 703 is specifically configured to perform the method mentioned in operation 23 and an equivalent replacement method. The second obtaining module 704 is specifically configured to perform the method mentioned in operation 24 and an equivalent replacement method. The movement module 705 is specifically configured to perform the method mentioned in operation 25 and an equivalent replacement method.

More specifically, the scanning module 701 may perform the methods in operation 331 to operation 337 and operation 341 to operation 343. The fusion module 703 may perform the method in operation 351 to operation 356.

The foregoing specific method embodiments and interpretations, descriptions, and extensions of technical features in the embodiments are also applicable to method execution in the apparatus embodiment, and details are not described in the apparatus embodiments.

The apparatus 700 provided in this embodiment of the present invention can implement an integrated design from scanning, 3D reconstruction, skeletal rigging, to preset animation display for an object, without requiring a user to use a professional, heavy, and complex device for professional scanning or performing complex modeling and animation processing on a PC end. These functions are integrated and provided for the user, so that the user can easily perform these operation methods on one mobile terminal, and any "static object (or similar to a static object)" around the user can be animated and vitalized, thereby increasing interest in using the terminal by the user and improving user experience.

It should be understood that division into the modules in the foregoing apparatus 700 is merely logical function division, some or all of which may be integrated, in actual implementation, into one physical entity, or may be physically separated. For example, each of the foregoing modules may be a separate processing element, or may be integrated on a chip of a terminal, or may be stored in a storage element of a controller in a form of program code, and a processing element of the processor invokes and executes a function of each of the foregoing modules. In addition, the modules may be integrated or may be implemented independently. The processing element may be an integrated circuit chip and has a signal processing capability. In an implementation process, steps in the foregoing methods or the foregoing modules can be implemented by using a hardware integrated logical circuit in the processing element, or by using instructions in a form of software. The processing element may be a general-purpose processor, for example, a central processing unit (CPU for short), or may be one or more integrated circuits configured to implement the foregoing method, for example, one or more application-specific integrated circuits (ASIC for short), or one or more microprocessors (DSP for short), or one or more field-programmable gate arrays (FPGA for short), or the like.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although the embodiments of the present invention are described, persons skilled in the art can make changes and modifications to these embodiments once they learn the basic inventive concept. Therefore, the following claims are intended to be construed as to cover the embodiments and all changes and modifications falling within the scope of the present invention. It is clearly that persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. An object modeling and movement method, comprising:
   performing panoramic scanning on a target object using a color camera and a depth camera of a mobile terminal, to obtain a sequence of color images and a sequence of depth maps, wherein the panoramic scanning is performed by placing the target object in front of the color camera and the depth camera and rotating the target object in an all-round direction while keeping the mobile terminal still to obtain the sequence of color images and the sequence of depth maps, wherein the color camera and the depth camera are located on one side of the mobile terminal;
   providing a scanning progress to a user indicating whether a panorama of the target object is covered, wherein the panoramic scanning of the object is performed at an interval of a preset angle and a union set of scanned images enable construction of the target object, wherein the user is prompted when scanning completes indicating the union set of scanned images enable construction of the target object;
   obtaining a 3D model of the target object based on the sequence of color images and the sequence of depth maps;
   obtaining a current movement manner of a first object;
   animating the 3D model of the target object to move in the current movement manner of the first object;
   determining keyframe information for texture mapping;
   selecting N keyframes for each of roll, yaw, and pitch directions for the texture mapping by applying a selection policy and an angle policy based on the keyframe information, wherein the angle policy divides 360 degrees into 360/N areas, wherein N is a preset number, wherein the selection policy utilizes a gradient method and a sobel operator to perform blurriness computation to select the N keyframes; and
   mapping a texture for the 3D model of the target object based on the N keyframes.

2. The method according to claim 1, wherein the obtaining a current movement manner of a first object comprises:
   capturing a real-time action of the first object; and
   using a movement manner of the real-time action of the first object as the current movement manner of the first object.

3. The method according to claim 1, further comprising:
   when the 3D model of the target object moves in the current movement manner of the first object, using a captured image of a real-time action of the first object as a background of a movement of the target object.

4. The method according to claim 1, wherein the target object is a static object, and the first object is a character.

5. The method according to claim 1, wherein the performing panoramic scanning on a target object comprises:
   synchronously invoking the color camera and the depth camera to scan the target object, wherein a shooting frame rate of the color camera and a shooting frame rate of the depth camera are both greater than or equal to 25 frames per second (fps).

6. The method according to claim 1, wherein before performing panoramic scanning on a target object, the method further comprises:
   displaying a preview image, wherein an identifier in the preview image prompts whether the target object is suitable to be scanned.

7. The method according to claim 1, wherein performing panoramic scanning on a target object further comprises:
   presenting scanning progress for the target object on a display interface of the mobile terminal.

8. The method according to claim 1, wherein animating the 3D model of the target object to move in the current movement manner of the first object further comprises:
   displaying a shadow of the 3D model of the target object on a display interface.

9. The method according to claim 1, wherein after obtaining a 3D model of the target object, the method further comprises:
   obtaining a target skeletal model; and
   fusing the target skeletal model and the 3D model of the target object; and
   wherein animating the 3D model of the target object to move in the current movement manner of the first object comprises:
   controlling the target skeletal model to move in the current movement manner of the first object, to animate the 3D model, obtained through fusion, of the target object to move in the current movement manner of the first object.

10. The method according claim 9, wherein the obtaining a target skeletal model comprises:
    receiving an operation instruction of a user, wherein the operation instruction is used to combine at least two line segments and at least one point into a skeletal model, wherein the line segment represents a skeleton in the skeletal model and the at least one point represents a joint node in the skeletal model; or
    obtaining a skeletal model that matches an outline of the target object, and using the skeletal model as the target skeletal model.

11. The method according to claim 9, further comprising:
    performing a skinning operation on the target skeletal model and the 3D model of the target object to determine a position change of a point on a surface of the 3D model of the target object based on movement of the target skeletal model, to enable the 3D model of the target object to move along with the target skeletal model.

12. The method according to claim 1, wherein the obtaining the 3D model of the target object comprises obtaining a target skeletal model from a plurality of skeletal models representative of the target object based on a highest degree of matching between the target skeletal model and a shape of the target object and fusing the target skeletal model with the 3D model of the target object.

13. The method according to claim 1, further comprising:
determining whether a preset quantity of keyframes are stored at intervals of a specified angle for each of roll, yaw, and pitch directions;
if a quantity of stored keyframes is less than the preset quantity for each interval of the specified angle, instructing the user to perform additional scanning; and
if the quantity of stored keyframes is sufficient to cover a panoramic view of the target object, prompting the user that scanning completes.

14. The method according to claim 1, further comprising performing blurriness computation using a gradient method, wherein the blurriness computation calculates a blur value based on a sum of difference values and the sum of difference values is calculated using a pixel value in an image together with two pixel values corresponding to a right side of a pixel and at a lower side of a pixel.

15. An object modeling and movement apparatus, wherein the apparatus is applied to a mobile terminal, the mobile terminal comprises a color camera and a depth camera, and the color camera and the depth camera are located on one side of the mobile terminal; and the apparatus comprises:
a scanning module configured to perform panoramic scanning on a target object by using the color camera and the depth camera of the mobile terminal, to obtain a sequence of color images and a sequence of depth maps; and obtain a 3D model of the target object based on the sequence of color images and the sequence of depth maps, wherein the panoramic scanning is performed by placing the target object in front of the color camera and the depth camera and rotating the target object in an all-round direction while keeping the mobile terminal still to obtain the sequence of color images and the sequence of depth maps, wherein the color camera and the depth camera are located on one side of the mobile terminal;
a display interface configured to provide a scanning progress to a user indicating whether a panorama of the target object is covered, wherein the panoramic scanning of the object is performed at an interval of a preset angle and a union set of scanned images enable construction of the target object, wherein the user is prompted when scanning completes indicating the union set of scanned images enable construction of the target object;
a second obtaining module configured to obtain a current movement manner of a first object; and
a movement module configured to animate the 3D model of the target object to move in the current movement manner of the first object,
wherein the scanning module is further configured to:
determine keyframe information for texture mapping;
select N keyframes for each of roll, yaw, and pitch directions for the texture mapping by applying a selection policy and an angle policy based on the keyframe information, wherein the angle policy divides 360 degrees into 360/N areas, wherein N is a preset number, wherein the selection policy utilizes a gradient method and a sobel operator to perform blurriness computation to select the N keyframes; and
map a texture for the 3D model of the target object based on the N keyframes.

16. The apparatus according to claim 15, wherein the second obtaining module is configured to:
capture a real-time action of the first object; and
use a movement manner of the real-time action of the first object as the current movement manner of the first object.

17. The apparatus according to claim 15, wherein the movement module is further configured to:
when the 3D model of the target object moves in the current movement manner of the first object, use a captured image of a real-time action of the first object as a background of the movement of the target object.

18. The apparatus according to claim 15, wherein the target object is a static object, and the first object is a character.

19. The apparatus according to claim 15, wherein the scanning module is further configured to:
display a preview image, wherein an identifier in the preview image prompts whether the target object is suitable to be scanned.

20. The apparatus according to claim 15, wherein the movement module is further configured to:
display a shadow of the 3D model of the target object on a display interface of the mobile terminal.

21. The apparatus according to claim 15, further comprising:
a first obtaining module configured to obtain a target skeletal model;
a fusion module configured to fuse the target skeletal model and the 3D model of the target object; wherein
the movement module is configured to control the target skeletal model to move in the current movement manner of the first object, to animate the 3D model, obtained through fusion, of the target object to move in the current movement manner of the first object; and
the first obtaining module is configured to:
receive an operation instruction of a user, wherein the operation instruction is used to combine at least two line segments and at least one point into a skeletal model, wherein the line segment represents a skeleton in the skeletal model and the at least one point represents a joint node in the skeletal model; or
obtain a skeletal model that matches an outline of the target object, and use the skeletal model as the target skeletal model.

22. A terminal device, wherein the terminal device comprises a memory, a processor, a bus, a depth camera, and a color camera coupled via the bus, wherein the memory is configured to store a computer program and an instruction; and the processor is configured to invoke the computer program and the instruction, to enable the terminal device to perform operations, comprising:
performing panoramic scanning on a target object using the color camera and the depth camera, to obtain a sequence of color images and a sequence of depth maps, wherein the panoramic scanning is performed by placing the target object in front of the color camera and the depth camera and rotating the target object in an all-round direction while keeping the terminal device still to obtain the sequence of color images and the sequence of depth maps, wherein the color camera and the depth camera are located on one side of the terminal device;

providing a scanning progress to a user indicating whether a panorama of the target object is covered, wherein the panoramic scanning of the target object is performed at an interval of a preset angle and a union set of scanned images enable construction of the target object, wherein the user is prompted when scanning completes indicating the union set of scanned images enable construction of the target object;

obtaining a 3D model of the target object based on the sequence of color images and the sequence of depth maps;

obtaining a current movement manner of a first object;

animating the 3D model of the target object to move in the current movement manner of the first object;

determining keyframe information for texture mapping;

selecting N keyframes for each of roll, yaw, and pitch directions for the texture mapping by applying a selection policy and an angle policy based on the keyframe information, wherein the angle policy divides 360 degrees into 360/N areas, wherein N is a preset number, wherein the selection policy utilizes a gradient method and a sobel operator to perform blurriness computation to select the N keyframes; and mapping a texture for the 3D model of the target object based on the N keyframes.

23. The terminal device according to claim 22, wherein the terminal device further comprises an antenna system, and the antenna system sends and receives a wireless communication signal under control of the processor, to implement wireless communication with a mobile communications network, wherein the mobile communications network comprises one or more of the following: a GSM network, a CDMA network, a 3G network, a 4G network, a 5G network, FDMA, TDMA, PDC, TACS, AMPS, WCDMA, TDSCDMA, Wi-Fi, and an LTE network.

\* \* \* \* \*